(No Model.)
N. W. HOLT.
DUST COLLECTOR.
No. 409,465. Patented Aug. 20, 1889.
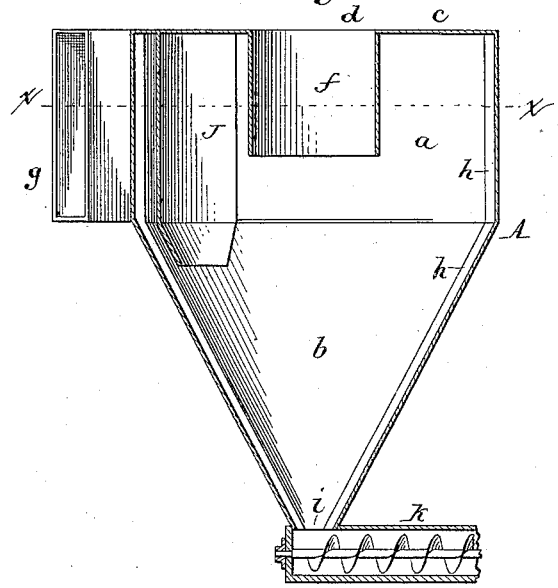
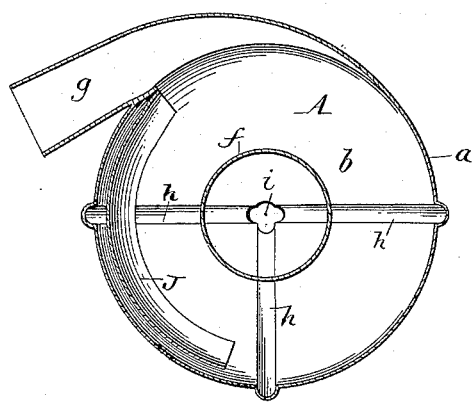
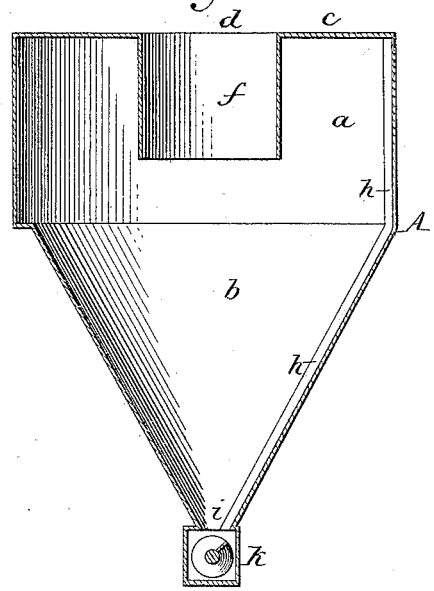

UNITED STATES PATENT OFFICE.

NOAH W. HOLT, OF JACKSON, MICHIGAN, ASSIGNOR TO THE KNICKERBOCKER COMPANY, OF SAME PLACE.

DUST-COLLECTOR.

SPECIFICATION forming part of Letters Patent No. 409,465, dated August 20, 1889.

Application filed July 6, 1886. Serial No. 207,178. (No model.)

*To all whom it may concern:*

Be it known that I, NOAH W. HOLT, a citizen of the United States, residing at Jackson, in the county of Jackson and State of Michigan, have invented certain new and useful Improvements in Dust-Collectors, of which the following is a specification.

This invention relates to that class of dust-collectors in which the separating-chamber is provided with an imperforate peripheral wall, a tangential inlet-spout for the dust-laden air, by which the air and dust are caused to whirl or rotate within the separating-chamber, a central air-exit at one end of the separating-chamber, through which the air freed from dust escapes, and an outlet for the dust or other separated solid matter.

The object of my invention is to improve the construction of the machine in such a manner as to facilitate the separation and collection of the dust and its discharge from the separating-chamber.

In the accompanying drawings, Figure 1 is a vertical section of my improved dust-collector. Fig. 2 is a horizontal section in line $x\ x$, Fig. 1. Fig. 3 is a vertical section at right angles to Fig. 1.

Like letters of reference refer to like parts in the several figures.

A represents the separating-chamber, composed of an upper cylindrical portion $a$, a lower conical or tapering portion $b$, and a head or covering $c$, which covers or closes the top of the upper cylindrical portion $a$, and which is provided with a central opening $d$, through which the air which has been freed from the dust escapes from the machine. This opening is provided with a tube or sleeve $f$, which depends from the cover $c$ into the upper cylindrical portion of the separating-chamber.

$g$ represents the inlet-spout for the dust-laden air, which opens tangentially into the side of the upper cylindrical portion of the separating-chamber, so as to cause the air and dust to assume a whirling or gyrating motion in the same, whereby the dust particles are driven by centrifugal force against the imperforate peripheral wall of the separating-chamber, while the air particles as they become free from dust move inwardly, or toward the axis of the separating-chamber, and finally escape therefrom, practically free from dust, through the tube $f$ and the exit-opening $d$.

$h$ represents depressed or recessed dust-conduits or discharge-passages formed in the side of the separating-chamber and extending downwardly in the same to the dust-discharge opening $i$ at the small end of the conical portion of the separating-chamber. These recessed discharges or grooves are closed on all sides except on their inner side, where they open inwardly into the separating-chamber and extend, preferably, from the top of the cylindrical portion of the separating-chamber to the small end of the conical portion thereof. The solid particles which are thrown against the peripheral wall of the separating-chamber by centrifugal force enter the depressed conduits and follow the same to the dust-discharge opening. Upon entering the depressed conduits the solid particles are to a large extent removed from the influence of the whirling air-current. The inner surface of the separating-chamber is thereby relieved from the accumulation of solid matter, which takes place near its small end, when the solid matter moves in converging helical lines over the tapering wall to the dust-discharge opening at the apex thereof.

J represents a shield or skimmer arranged within the cylindrical portion of the dust-collecting chamber at a short distance inwardly from the peripheral wall thereof and concentric therewith. This skimmer is open at its front end, where it receives the blast, and closed at its rear end by being secured to the peripheral wall of the separating-chamber at or near the point where the inner wall of the tangential inlet-spout connects with the separating-chamber. This skimmer may extend a short distance into the lower tapering portion of the dust-collecting chamber, in which case its lower portion is inclined concentric therewith, as indicated in the drawings. The outer layer of dust-laden air, in which the dust is densest, is skimmed off by this skimmer and prevented from crossing the opening through which the blast is delivered into the separating-chamber.

$k$ represents a conveyer, which receives and removes the dust discharged from the small end of the separating-chamber. The cylindro-conoidal form of the separating-chamber permits of the ready attachment of the blast-spout to the side of the separating-chamber, increases the capacity of the separating-chamber, and causes the air-blast to sweep around in the separating-chamber in a broad stream, whereby a practically complete deposit of the solid matter against the peripheral wall of the separating-chamber is effected.

I claim as my invention—

1. The combination, with a separating-chamber having an imperforate peripheral wall and means whereby the dust-laden air is caused to assume a whirling motion in the same, of a recessed or depressed dust-discharge formed in the peripheral wall of the separating-chamber, substantially as set forth.

2. The combination, with a tapering separating-chamber, of an inlet-spout which delivers the dust-laden air to the large end of the separating-chamber, an air-exit at the large end of the separating-chamber, and a recessed or depressed dust-discharge formed in the side of the tapering chamber and provided with a discharge-opening at the small end thereof, substantially as set forth.

3. The combination, with the dust-separating chamber having an imperforate peripheral wall, a tangential inlet-spout, a central air-exit, and a dust-discharge opening, of a shield or skimmer arranged within the separating-chamber, open at its front end, where it receives the dust, and closed at its rear end, substantially as set forth.

4. The combination, with a dust-collecting chamber having an imperforate peripheral wall composed of a cylindrical and a conical or tapering portion, and having a central air-exit in the cylindrical portion and a dust-exit at the apex of the conical portion, of an inlet-spout opening tangentially into the side of the cylindrical portion, substantially as set forth.

NOAH W. HOLT.

Witnesses:
WM. K. GIBSON,
J. T. HAMMOND.